UNITED STATES PATENT OFFICE.

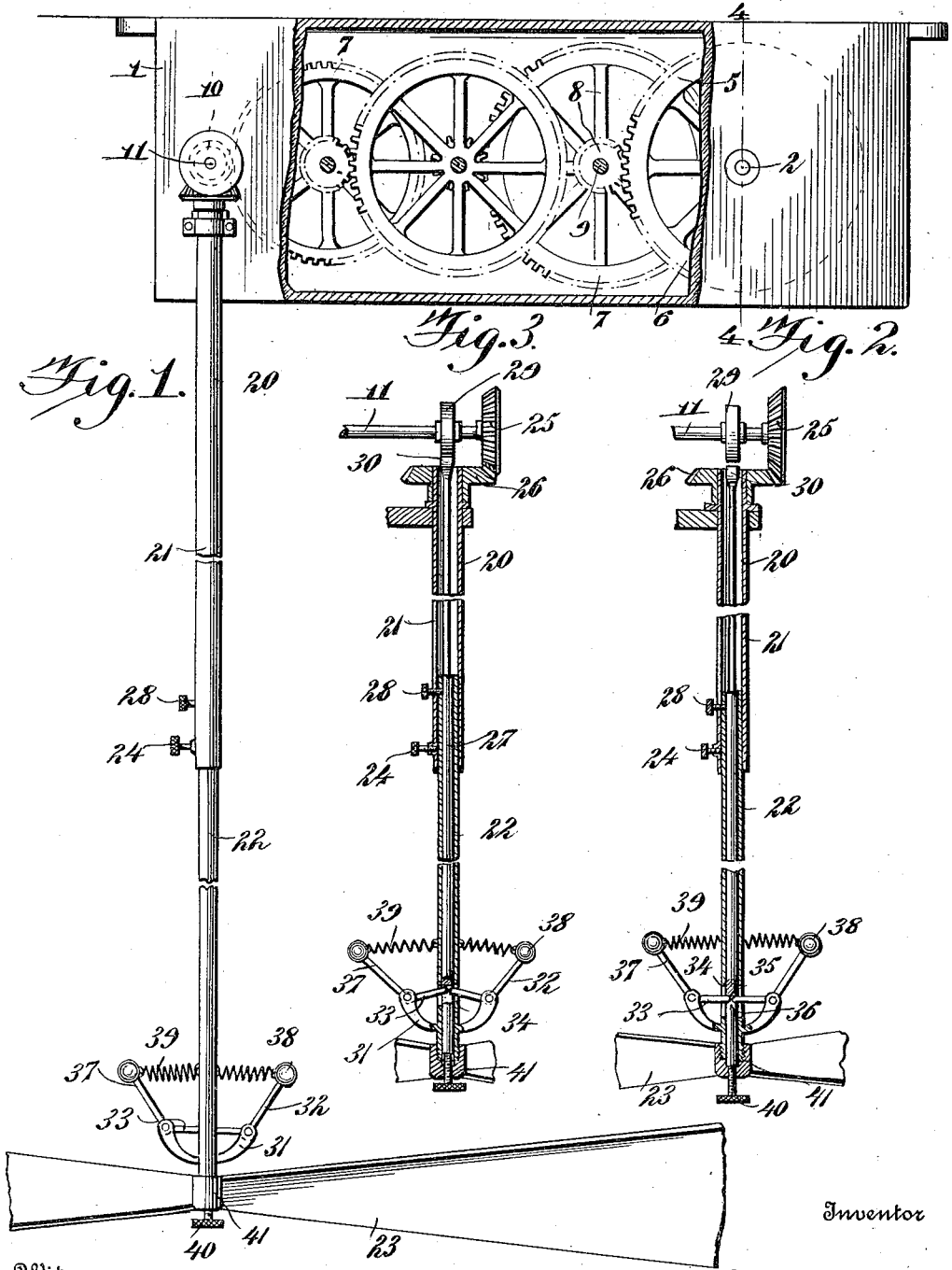

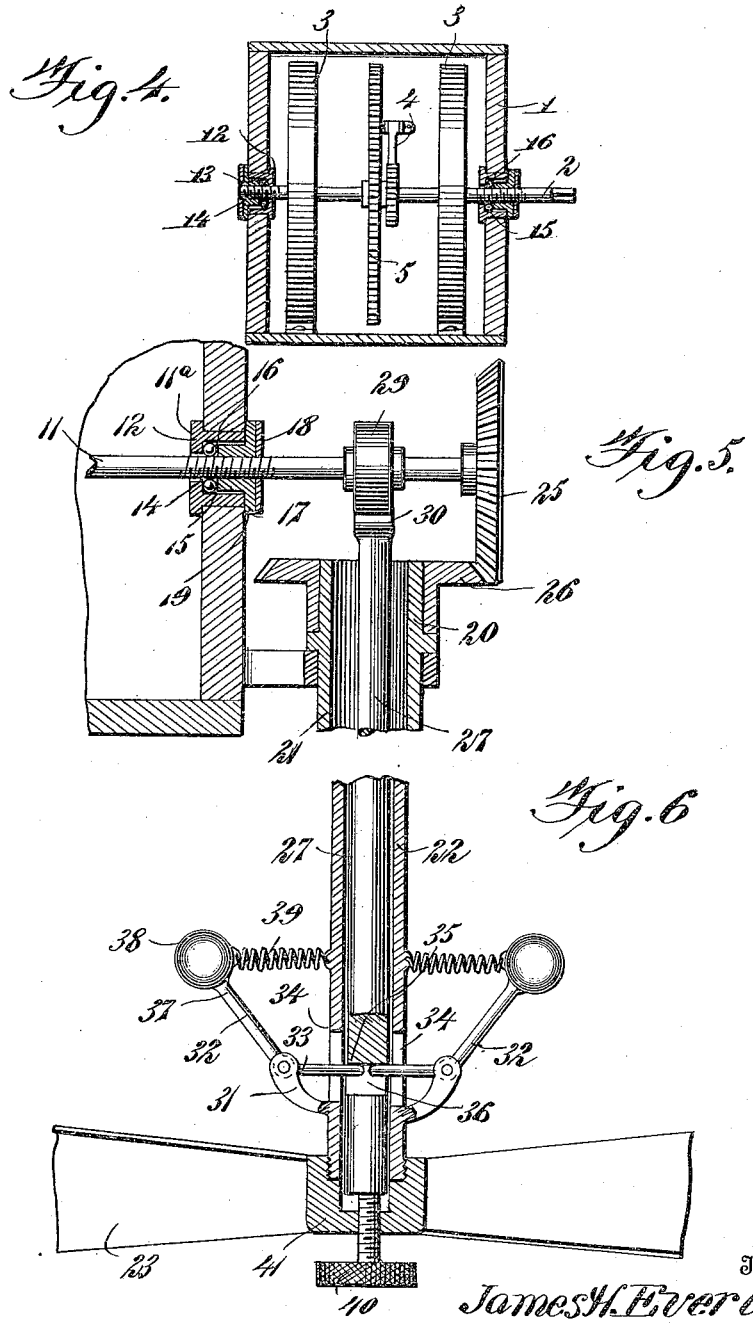

JAMES H. EVERITT, OF CANTON, TEXAS.

FAN-ACTUATING MECHANISM.

1,134,830.  Specification of Letters Patent.  Patented Apr. 6, 1915.

Application filed June 29, 1912. Serial No. 706,690.

*To all whom it may concern:*

Be it known that I, JAMES H. EVERITT, a citizen of the United States, residing at Canton, in the county of Van Zandt and State of Texas, have invented new and useful Improvements in Fan-Actuating Mechanism, of which the following is a specification.

This invention relates to fans and has for an object to provide a motor therefor whose power may be derived through a spring whereby the fan may be driven at the maximum speed with the minimum cost.

Another object of the invention is to provide a novel form of governor for regulating the speed of the fan shaft and designed to form a stopping and starting means whereby the motor can be thrown into or out of operation conveniently at the discretion of the operator.

Another object of the invention is to provide such governor and starting and stopping mechanism whose manually controlled actuating element may be arranged immediately beneath the fan where it may be in easy reach of the operator.

In the drawing forming a portion of this application, and in which like letters of reference indicate similar parts in the several views:—Figure 1 is a side view of the motor and driving fan therefor. Fig. 2 is a longitudinal section therethrough showing the brake in applied position to stop the motor. Fig. 3 is a similar view showing the brake released. Fig. 4 is a section on line 4—4 of Fig. 1. Fig. 5 is a detail section through a portion of the driving shaft and a portion of the fan shaft. Fig. 6 is a section on an enlarged scale through the governor and through the fan shaft and the governor controlled brake.

The apparatus which is designed chiefly to be used as a substitute for electrically controlled fans comprises a casing 1 which has mounted therein a main driving shaft 2 which may be connected in any suitable well known manner with one or more springs 3 which may be employed for driving the shaft. The shaft is provided with a suitable ratchet detent 4 whereby it is held against retrograde rotation. With a view to imparting to the fan shaft the maximum speed I provide a multiplying gearing train 5 which includes a large driving gear wheel 6 on the power shaft 2 and intermeshing large and small gear wheels 7 and 8 on adjacent parallel shafts 9, the large gear wheel 7 of one of the shafts being in mesh with a small pinion 10 on a countershaft 11.

The power shaft 2 and the adjacent driven shafts 9 are all mounted in thrust bearings 11$^a$ in the side of the casing 1 and as illustrated these bearings include sleeves 12 which are fixed in the said side walls of the casing and sleeves 13 that are threadedly adjustable as at 14, on the extremities of the shafts. The sleeves 13 fit within the sleeves 12, being suitably spaced therefrom to provide intervening raceways 15 therebetween to accommodate anti-friction bodies 16 whereby freedom of rotation is given to the shafts. The sleeves 13 are provided with flanges 17 that are exteriorly located upon the walls of the casing 1 and which are adapted to have frictionally engaged therewith jam nuts 18 whereby the said sleeves 13 will be effectually held in their adjusted positions. The flanges 17 are preferably exteriorly knurled as at 19 whereby the sleeves can be conveniently adjusted. The association of the sleeves 13 against the anti-friction bodies 16 serves to hold the shafts 2 and 9 against longitudinal movement relatively and as a consequence all of the driving and driven gear wheels are held in proper intermeshing engagement.

A fan shaft 20 is mounted in suitable bearings upon the casing 1 and as illustrated said shaft includes telescopic sections 21 and 22 that may be adjusted longitudinally relatively whereby the fan 23 of the section 22 can be disposed at any suitable proximity to the object around which the air is to be disturbed or agitated by the fan. A set screw or the like 24 upon the upper section 21 is adapted to engage against the lower section 22 whereby to hold the latter against movement in the former. The fan driving shaft 11 is provided with a beveled gear wheel 25 which meshes with a similar gear wheel 26 upon the upper end of the section 21 of the fan shaft. Means for governing the speed of movement of the motor and for stopping or starting the same at the discretion of the operator comprises a telescopic member 27 in the telescopic sections 21 and 22 of the fan shaft, the latter being constructed whereby adjustment of the former can be made as shown and the said member 27 being provided with means 28 whereby its adjustment may be retained.

The shaft 11 is provided with a friction wheel 29 which is disposed above a brake shoe 30 on the upper end of the member 27. The section 23 of the fan shaft is provided with lateral brackets 31 in which bell crank levers 32 are pivoted. These levers have short arms at 33 which extend into vertical elongated slots 34 in the said shaft section 23, the extremities of which being located immediately beneath a surface or wall 35 in a slot 36 in the said member 27. The long arms 37 of the said bell crank levers have weights 38 secured thereto. Springs 39 connect the section 23 of the fan shaft with the long arms 37 whereby to normally maintain a neutral position of the levers. A manipulating screw or manually operated regulator 40 is adjustably mounted in the hub 41 of the fan 23 being disposed immediately beneath the member 27 whereby the latter can be manually adjusted when movement is imparted to the former.

Now that the details of construction of the apparatus are clearly described it is said that on the initial starting of the motor the regulator 40 is adjusted so as to permit a slight fall of the member 27 to effect a release of the shoe 30 thereof from the brake wheel 29. The motor is then free to operate under the influence of its driving spring. The governor, under the centrifugal force of the fan shaft will operate in such manner that the bell crank levers will be rocked so as to cause the short arms 33 thereof to engage against the surface 25 with a resultant lift of the member 27 to thereby insure an automatic application of the shoe 30 when the machine is in operation.

I claim:—

In a device of the class described, a driven member having a slot, a driving motor therefor including a shaft geared to the driven member and provided with a brake element, a movable member having a slot mounted in said driven member and adapted for engagement with said brake element, means for manually affecting the adjustment of said last named member, and means pivotally connected to the driven member having a portion thereof protruding through the slot of the latter and through the movable member for automatically affecting the adjustment of said movable member.

In testimony whereof I affix my signature in presence of two witnesses.

JAMES H. EVERITT.

Witnesses:
W. S. PRESTRIDGE,
S. E. COX.